US 8,978,576 B2

(12) United States Patent
Brandt, Jr. et al.

(10) Patent No.: US 8,978,576 B2
(45) Date of Patent: Mar. 17, 2015

(54) SPIRAL GAS-SOLIDS CONTACT APPARATUS

(71) Applicant: Mars, Incorporated, McLean, VA (US)

(72) Inventors: Robert Otto Brandt, Jr., Wilmington, NC (US); Peter Thomas Kashulines, Jr., Mountain Lakes, NJ (US); Thomas C. Britt, Wilmington, NC (US); K. Ressie Cavenaugh, Rose Hill, NC (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 13/667,582

(22) Filed: Nov. 2, 2012

(65) Prior Publication Data

US 2013/0055907 A1    Mar. 7, 2013

Related U.S. Application Data

(62) Division of application No. 11/869,347, filed on Oct. 9, 2007, now Pat. No. 8,323,711.

(51) Int. Cl.
*A23G 3/02* (2006.01)
*A23G 3/26* (2006.01)
(Continued)

(52) U.S. Cl.
CPC ... *A23G 3/26* (2013.01); *B05C 3/08* (2013.01); *A23G 3/0095* (2013.01); *A23G 4/025* (2013.01); *A23G 7/02* (2013.01); *A23N 12/10* (2013.01); *A23P 1/085* (2013.01)
USPC ................. 118/19; 118/20; 118/418

(58) Field of Classification Search
CPC ........................................................ B05C 3/08
USPC ............ 118/19, 20, 418; 99/404, 386, 443 C, 99/443 R, 477, 478; 34/137, 381, 386; 366/25, 59, 227
See application file for complete search history.

(56) References Cited

U.S. PATENT DOCUMENTS

| 2,301,922 | A |   | 11/1942 | Atti |
|---|---|---|---|---|
| 2,744,338 | A | * | 5/1956 | Rothe ............................. 34/58 |
| 3,911,860 | A |   | 10/1975 | Nohynek |
| 4,334,366 | A | * | 6/1982 | Lockwood ..................... 34/425 |

(Continued)

FOREIGN PATENT DOCUMENTS

| EP | 0192012 | 8/1986 |
|---|---|---|
| SU | 848029 | 7/1981 |

(Continued)

OTHER PUBLICATIONS

Perry, R.H.; Green, D.W. (1997). Perry's Chemical Engineers' Handbook (7th Edition). McGraw-Hill. Online version available at: http://knovel.com/web/portal/browse/display?_EXT_KNOVEL_DISPLAY bookid=48&VerticalID=0, p. 12-53 (Parent U.S. Appl. No. 11/869,347).*

(Continued)

*Primary Examiner* — Laura Edwards
(74) *Attorney, Agent, or Firm* — Mars, Incorporated; Colleen Kramer

(57) ABSTRACT

The invention is directed to apparatus and methods for contacting gas and solids in the manufacture of edibles, and particularly in connection with coating edible particulate solids. A drum is positioned around an inner tube so that an annular space is defined between the drum and the tube. A rotatable spiral element defines a gas pathway in the annular space, such that rotation of the spiral pushes particulate solids through the drum while the solids are contacted with gas in the annular space.

10 Claims, 3 Drawing Sheets

(51) Int. Cl.
  *B05C 3/08*   (2006.01)
  *A23G 3/34*   (2006.01)
  *A23G 4/02*   (2006.01)
  *A23G 7/02*   (2006.01)
  *A23N 12/10*  (2006.01)
  *A23P 1/08*   (2006.01)

(56) References Cited

U.S. PATENT DOCUMENTS

| | | |
|---|---|---|
| 4,499,847 A | 2/1985 | Dunaitschik |
| 4,658,708 A | 4/1987 | Rastoin |
| 4,958,443 A | 9/1990 | Hauster |
| 5,010,838 A | 4/1991 | Simelunas et al. |
| 5,033,405 A | 7/1991 | Yamada |
| 5,334,244 A | 8/1994 | Bohle |
| 5,507,868 A | 4/1996 | Takei |
| 5,520,457 A | 5/1996 | Gontero et al. |
| 5,538,195 A | 7/1996 | Nakazawa |
| 5,787,799 A | 8/1998 | Mohrhauser |
| 6,364,948 B1 | 4/2002 | Austin et al. |
| 6,365,203 B2 | 4/2002 | Degady |
| 6,638,550 B2 | 10/2003 | Banko et al. |
| 6,689,417 B2 | 2/2004 | Brandt, Jr. |
| 6,740,162 B2 | 5/2004 | Hüttlin |
| 6,840,712 B2 | 1/2005 | Satchwell |
| 6,960,361 B2 | 11/2005 | Chisholm et al. |
| 7,022,353 B2 | 4/2006 | Degady et al. |
| 2004/0109936 A1 | 6/2004 | Banko |

FOREIGN PATENT DOCUMENTS

| | | |
|---|---|---|
| WO | 99/26484 | 6/1999 |
| WO | 2005/011398 | 2/2005 |

OTHER PUBLICATIONS

Bachurskaya et al., "Technology of food concentrates", Pishchevaya promishlennost, 1970, pp. 235-236, Moscow.

Paul et al.,(2004). Handbook of Industrial Mixing—Science and Practice, John Wiley & Sons. Online version available at http://knovel.com/web/portal/browse/display, Chapter 7.

* cited by examiner

SPIRAL GAS-SOLIDS CONTACT APPARATUS

CROSS REFERENCE TO RELATED APPLICATION

This application is a divisional of application Ser. No., 11,869,347, filed Oct. 9, 2007, now U.S. Pat. No. 8,323,711. The entire contents of this application is hereby incorporated by reference herein.

BACKGROUND OF THE INVENTION

1. Field of the Invention

The invention is directed to apparatus and methods for contacting gas and solids in the manufacture of edibles, and may be used for drying, drying combined with coating, heating, cooling, and cooling combined with coating.

2. Description of the Related Art

Application of a sugar layer to the exterior of a solid particle is a common practice in the confectionery and pharmaceutical arts. The commonly practiced batch panning process, in which sugar syrup is added to the solids shot by shot, is highly capital and labor-intensive, and a significant amount of sugar is carried away in the course of drying. There would be many practical advantages if such coating processes could be practiced on a continuous basis. However, apparatus for conducting this type of coating on a continuous basis have not gained widespread acceptance because they have not yielded acceptable product quality.

U.S. Pat. Nos. 6,364,948 and 6,689,417, which are owned by the assignee herein, are directed to methods and apparatus for batch coating and/or drying (including methods for making sugar shell coated products) in which particles are placed in a bed and displaced in the x, y and z directions by vibrating the bed so that the particles follow a dominant path or direction. Drying air is provided tangentially to the bed.

U.S. Pat. No. 6,638,550, owned by the assignee herein, is directed to methods for forming a shell coating on a mass of confectionery centers. The process may utilize a rotatable drum in which a current of drying gas is provided having a controlled moisture content.

U.S. Pat. No. 6,960,361, owned by the assignee herein, is directed to a panning apparatus for coating a plurality of center materials. The panning drum incorporates a partition, dividing the drum into a plurality of coating vessels.

Published International Application WO 99/26484 teaches an apparatus for batch coating chewing gum or other edible materials. The apparatus comprises a rotating drum having angled baffles on the inside. Liquid coating material is provided through an internal pipe running along the axis of the drum, and drying air is provided through a plurality of air distribution chambers arranged around the periphery of the drum. Air supply and removal conduits are provided so that drying air travels axially in the drum.

U.S. Pat. Nos. 6,365,203 B2 and 7,022,353 B2 teach a method and apparatus for continuous coating of gum materials. The coating material may be a hardenable sugar solution. The apparatus comprises a rotating drum which is angled with respect to the horizontal so that the edible pieces move through the drum by the force of gravity. The residence time is shortened or increased by raising or lowering the angle of the drum. Liquid coating material is fed to the drum through a central conduit along the principle axis of the drum, while heated drying air is preferably introduced through perforations in the side walls of the drum, to provide a uniform flow of drying air in the drum.

U.S. Pat. No. 5,520,457 and EP 0 192 012 teach coating apparatus and methods for coating particulate solids in which a rotating spiral brush is used to push material through a drum, which may also rotate. These apparatus and methods do not contemplate a system wherein a source of gas is provided to a substantially closed gas pathway defined by a spiral element.

WO 2005/011398 discloses a method for continuously coating cores in a dragee making process, which comprises transporting the cores through a rotating drum with a screw-like conveyor.

None of the foregoing disclosures effectively makes use of a closed gas path for contacting solids with gas in a controlled, continuous manner. A significant problem with prior art methods and apparatus for coating particulate solids concerns the handling of dust formed by the tumbling action of the solids. The dust becomes airborne and may damage humidity control systems. Expensive dust filtration equipment may be required, increasing both the complexity of the process and maintenance costs. This problem may be solved according to the present invention by directing the flow of process gas to ensure that dust formed by tumbling the solids is adhered to the solids before the solids are discharged from the apparatus.

SUMMARY OF THE INVENTION

The present invention is directed to methods and apparatus for effecting gas-solids contact in the manufacture of edibles, and can be adapted for coating particulate edible materials with flowable coating material and drying the coating on the particles, such as in the coating of chocolate centers with sugar syrup and drying to form a sugar shell in the production of M&M's® Milk Chocolate Candies. These methods and apparatus may also be used in connection with coating particulate edible materials with flowable coating material and solidifying the coating on the particles, such as in the coating of peanuts with liquid chocolate in the production of M&M's® Peanut Chocolate Candies. Alternatively, these methods and apparatus may be used for heating, e.g., cooking and roasting, and cooling of particulate edible materials.

Particulate edible materials that may be processed with the methods and apparatus of the invention include, without limitation, confectionery, including chocolate, caramel, nougat, gummies, pressed candies, and hard candies. As used herein, "chocolate" includes chocolate meeting the Standards of Identity (SOI) for chocolate defined by the Food and Drug Administration, as well as non-SOI chocolate. Edible materials also includes, without limitation, wafers, crackers, biscuits, cookies, granola, rice, grains, legumes, cocoa beans, coffee beans, nuts, fresh and dried fruits, fresh and dried vegetables, dairy snacks, cheese, pet food, and pet treats. Edible materials also includes pharmaceuticals, including without limitation, tablets, caplets, agglomerations, and gelcaps.

In one aspect, the invention is a gas-solids contact apparatus comprising a drum having an interior wall concentric with an inner tube and defining an annular space between the drum and the inner tube. Gas is supplied from a source of gas to the annular space at a gas entry zone, and particulate solids are introduced to the drum at a solids entry point. At least one spiral element (sometimes referred to herein simply as the "spiral") in the annular space defines a gas pathway in the annular space. Rotary motion is imparted to the spiral (with a motor, for example) to move the solids through the drum.

The gas-solids contact apparatus may be combined with a coating material dispenser for adding coating material, which is then dried or solidified on the surface of the solids as the solids progress through the drum.

In particularly preferred embodiments, especially where the apparatus is used for coating confectionery center materials with a sugar syrup and drying the coating to form a shell, the apparatus includes a drum rotatable around a horizontal longitudinal axis, and the gas entry zone and the solids entry point are proximate opposite ends of the drum with respect to the longitudinal axis, so that the gas travels along a gas pathway substantially countercurrently with respect to the solids traveling through the drum. This has the advantage that the process gas carries dust formed from the tumbling action of the solids in the direction of the wetted solids, so that the airborne dust adheres to the solids. Countercurrent, in this context, means that the gas entry zone and the solids entry point are generally at opposite sides of the drum.

In another aspect, the invention is a method of coating a plurality of edible particulate solids. A drum is provided having an interior wall concentric with an inner tube so that an annular space is defined between the inner tube and the drum. A spiral element is positioned in the annular space defining a gas pathway in the annular space, and is rotatable to move particulate solids through the drum. The method involves introducing particulate solids into the drum, applying a coating material to the particulate solids to form coated particulate solids, and imparting rotary motion to the spiral element to cause movement of the coated particulate solids through the drum. At the same time, gas is flowed from a gas entry zone along the gas pathway defined by the spiral element to dry or solidify the coating material on the particulate solids. After traveling through the drum, the coated particulate solids are discharged from the drum.

In another aspect, the invention is a method of contacting gas and particulate solids in the manufacture of edible products. A drum is provided as described above and particulate solids are introduced into the drum at a solids entry point. The spiral element is rotated so that the particulate solids are pushed through the drum in the annular space. Gas is flowed from a source of gas into the annular space along the gas pathway defined by the spiral element, and solid particulates are discharged from the drum. In this aspect of the invention, the method may used to heat or cool edibles without coating them.

DETAILED DESCRIPTION OF THE PREFERRED EMBODIMENTS

Figure 1A:
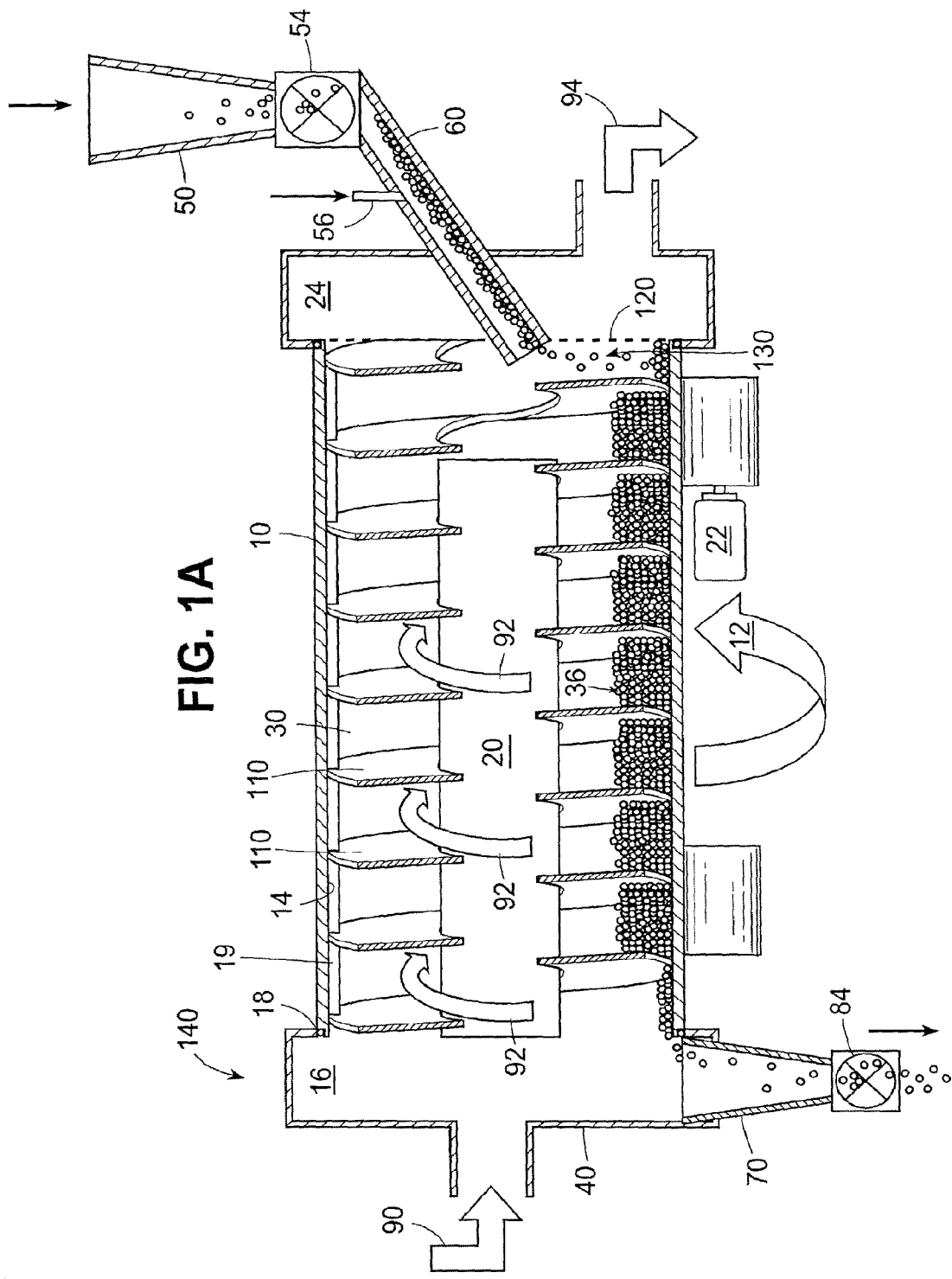
FIG. 1A is a side cutaway view of an apparatus according to the invention.

In an embodiment depicted in FIG. 1A, drum 10 is rotatable as indicated at 12. An annular space 30 is defined between interior wall 14 of the drum and the inner tube 20. In the embodiment shown, spiral element 110 extends from the interior wall of the drum into the annular space 30, and motor 22 imparts rotary motion to the drum and the attached spiral element, while the inner tube 20 remains stationary with respect to the spiral and drum.

Alternatively, a motor may be provided to impart rotary motion to the spiral 110, independently of the rotation of the drum 10. For example, the drum 10 may remain stationary, while the spiral extends from, and rotates with, inner tube 20. The rotation of the spiral primarily affects residence time of the solid particles in the drum, and the rotation of the drum primarily affects the speed of mixing of the particles.

Mixing ribs 19 are spaced on the interior surface of the drum, for example at 10°, 15° or 20° intervals, to reduce slippage of the product on the surface, and promote mixing. If the drum moves independently of the spiral, a mixing element may be attached to the edge of spiral 110 to perform a similar function. The height of the ribs on the interior surface of the drum may be determined by trial and error based on the size of the drum, the size of the solid particles, the spacing of the turns of the spiral and other considerations. In general, the mixing ribs have a height at least equal to the particle diameter. In embodiments, the ribs have a height in a range of about 0.1 cm to about 5.0 cm.

Figure 2:
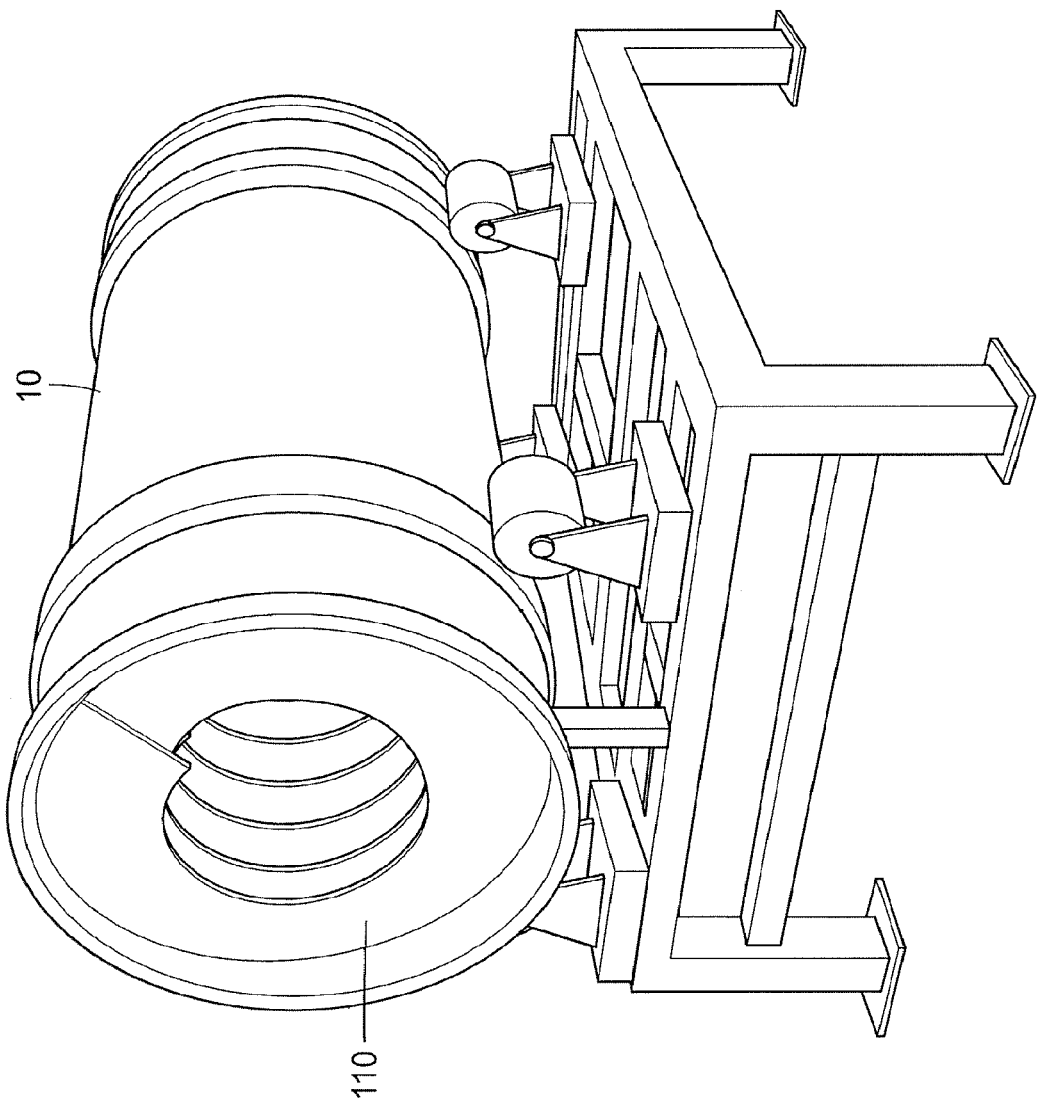
FIG. 2 is a perspective view of a drum and spiral element in the apparatus of FIG. 1A, with the inner tube removed, wherein the spiral element is attached to (and rotates with) the drum.

The spiral 110 extends radially into the annular space, positioned so that particulate solids are pushed through the drum as the spiral turns, in the manner of a screw. Typically, the drum is a regular cylinder, horizontally arranged, and the spiral is oriented on the same axis as the drum, occupying the entire annular space, as shown in FIG. 2. The distance between each turn of the spiral is referred to as the pitch. In the embodiment shown in FIG. 2, spiral 110 extends radially into the annular space 30 from the interior wall of the drum. Within the scope of the invention, the distance between turns of the spiral (the "pitch") can vary along the length of the spiral element, and the radius of turns of the spiral can vary.

Appropriate journaling 18 and air seals are provided, in a manner known to one of ordinary skill in the art, to allow for relative rotation of the drum, the inner tube, and/or the spiral element with respect to the stationary entrance shroud 24 and exit shroud 16.

In the apparatus, the solids are contacted only with the gas from gas supply 90 and not with ambient air from outside the drum, although some minimal contact may be unavoidable. Thus, the system is said to be "substantially sealed" to outside air, even though the system is not hermetically sealed. In a preferred embodiment, the system is "closed," in that gas withdrawn from the drum is conditioned at a gas conditioning plant (not shown) and returned to the gas entry zone. Alternatively, it may be possible to operate an "open" system, such that gas from the gas supply contacts the edible materials in the drum and thereafter is vented to the atmosphere.

The spiral element defines a gas pathway shown by arrows 92. The spiral element is configured in the annular space so that gas does not travel axially through the annular space except along the spiral path shown. There may be some escape of air, but this should be negligible.

In FIG. 1A, drum 10 has a substantially cylindrical interior wall rotatable around a horizontal longitudinal axis. The gas entry zone 140 and the solids entry point 130 are proximate opposite ends of the drum with respect to the longitudinal axis so that the movement of gas from gas supply 90 to gas exit 94 is substantially countercurrent to the movement of solids through the drum. Countercurrent operation is preferable in an application such as coating confectionery centers with liquid syrup combined with drying the liquid syrup to form a sugar shell, because the drying air having the lowest humidity is expected to contact the solids toward the end of the processing, where more intense drying is required. Also, as dust from the particulate solids and dried coating material becomes suspended in the gas, dust-laden gas is carried toward the solids entry point where the coating on the solids is more liquid, such that the gas is contacted with liquid coating material and dust is removed from the gas by adherence to the particles. A screen 120 or other suitable partition with apertures prevents particles from being entrained by the gas into the entrance shroud 24.

In other embodiments, the drum is rotatable around a horizontal longitudinal axis, as shown in FIG. 1A, but the gas entry zone and the solids entry point are positioned proximate the same end of the drum with respect to the longitudinal axis, so that the gas proceeds along a pathway in substantially co-current fashion with respect to the movement of solids through the drum. The co-current arrangement is preferable when the coating material is expected to require rapid initial cooling to solidify onto the particulate solids, such as a liquid chocolate coating material solidified on an edible center material. Co-current, in this context, means that the gas entry zone is generally on the same side of the drum as the solids entry point.

Where chocolate is used as a coating material, it may be desirable to utilize a co-current arrangement further to promote the formation of stable polymorphic forms of the chocolate as it cools. This arrangement may prevent exposure of the chocolate to air that is too cold, while exposing the chocolate coating to slightly warmer air where the chocolate is required to recrystallize.

In embodiments, the inner tube 20 is a closed, air-impermeable volume. In this case, gas supply 90 is introduced directly into the shroud 16, and then into annular space 30, in the direction of the gas pathway indicated by arrows 92.

Figure 1B:
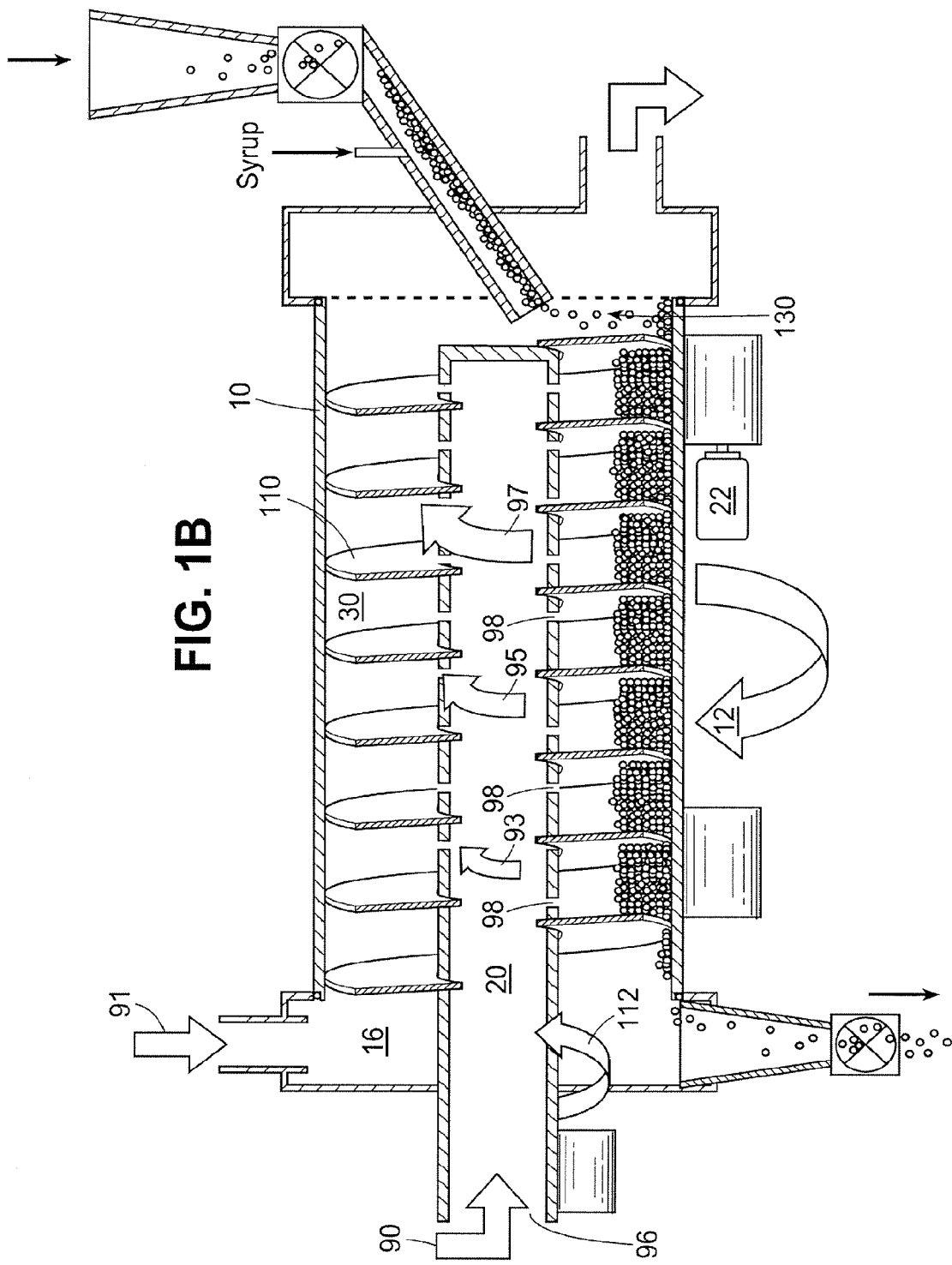
FIG. 1B is a side cutaway view of an apparatus according to the invention in an embodiment where gas is supplied inside the inner tube of the apparatus.

As shown in FIG. 1B, it is also possible to provide an opening 96 in the inner tube through which gas is supplied from gas supply 90. Apertures 98 in the inner tube 20 permit flow of a gas from the inner tube into the annular space between the drum and the inner tube. An additional source of gas 91 (which may be the same as or different from gas supply 90) may be provided directly to the annular space. By adding gas from inner tube 20 into the annular space 30 along the length of the drum, it is possible to control gas temperature and condition at different points in the process. For example, warmer air could be added toward the solids entry point to provide enhanced evaporation where the coated particulate solids are wetter. Arrows 93, 95 and 97 show an increase in gas mass flow rate along the length of the drum due to addition of gas from the inner tube 20 at different points along the drum. As in the embodiment depicted in FIG. 1A, the gas pathway is "closed" in the sense that the gas can only move through the drum along the path defined by the spiral element 110.

Once the gas exits inner tube 20, it follows the closed spiral pathway to gas exit 94. The apertures 98 can be placed where desired along the length of the inner tube 20. For example the apertures may be placed at specific points, rather than along the entire length of the tube as shown in FIG. 1B.

In FIG. 1B, the inner tube 20 is shown capable of rotating in a direction 112 opposite to the direction of rotation 12 of the drum 10. The inner tube 20 may also rotate in the same direction as the drum 10, or the inner tube 20 may remain stationary. In FIG. 1B, the spiral 110 is shown attached to and extending radially outward from the inner tube 20.

In the embodiment shown in FIG. 1A, wherein gas-solids contact is countercurrent, the length of the inner tube defines a gas-solids contact zone within the drum. A solids entry zone extends from a point where the inner tube terminates to the solids entry point 130, where solids are deposited in the drum (in FIG. 1A, this is just to the left of screen 120). A gas entry zone 140 extends from the gas supply 90 to the beginning of inner tube 20. Because the inner tube 20 typically does not extend the entire length of the drum, the gas has higher velocity in the gas-solids contact zone than in the solids entry zone because of the smaller cross-sectional area through which the gas flows along that length.

Depending on the application, the size of the drum relative to the inner tube, and the desired flow rate of the gas in different parts of the apparatus, the solids entry zone may have zero length (in the case where solids are deposited on the inner tube), or the solids entry zone may comprise from zero up to about 50 percent of the length of the drum. This length may be in a range of about 2 percent to about 30 percent of the length of the drum, and preferably is in a range of about 5 percent to about 15 percent of the length of the drum. In embodiments, the solids entry zone preferably constitutes about one to about two spiral pitch-lengths from where the solids enter the drum. The optimal length of the solids entry zone will depend on the amount of mixing required (in the solids entry zone, where the gas velocity is lower) compared to the amount of drying required (in the gas-solids contact zone, where the gas velocity is higher).

In the embodiment shown, particulate solids are added at solids entry point 130 to form a bed of particles 36 in the drum. The solids dispenser for dispensing particulate solids to the drum may comprise hopper 50, and inlet tube 60. A flow metering device, such as a screw feeder, belt feeder or similar device known to one of ordinary skill, may be used to meter a desired quantity of particulate solids. A rotary air lock 54 allows the controlled entry of product into the apparatus while minimizing excessive passage of air. A similar rotary air lock 84 at a solids exit 70 performs a similar function. A flowable coating material dispenser 56 dispenses a flowable coating material, such as liquid sugar syrup, in the inlet tube 60. The inlet tube 60 has a smaller diameter than the drum so that flowable coating material dispensed from flowable coating material dispenser 56 can be intimately contacted with the particulate solids before the particles are introduced into the drum. Thus, liquid syrup dribbled on particles in the inlet tube 60 is roughly distributed on a piece-to-piece basis onto the majority of particles before they reach the solids entry point 130. This initial piece-to-piece spreading in the inlet tube allows for more rapid and even spreading of the syrup onto all particle surfaces in the solids entry zone during the tumbling in the drum. The addition of syrup in the inlet tube also avoids syrup dripping directly on the spiral.

If the flowable coating material is a coating material crystallizable upon cooling, such as a chocolate or other fat-based material, a temperature-controlled coating material dispenser may be used (using thermal jacketing or the like) to keep the crystallizable coating material in a flowable state as the coating material is applied to the particulate solids.

In some instances, it may be desirable to use a plurality of coating material dispensers at a plurality of points along the drum. Depending on the coating material, it may be desirable to minimize the contact of the coating material with the spiral. Accordingly, a dispenser indexed to the pitch of the spiral, or a plurality of dispensers, accessing the annular space through the inner tube, may be provided.

For example, chocolate coating of solid particulates may be accomplished in the apparatus by a multiple point chocolate addition system (not shown). A chocolate addition nozzle is located midway between adjacent turns of the spiral along the length of the drum and passing through a specific point of the inner tube. Location of the nozzle midway between adjacent turns of the spiral is desirable to prevent chocolate dripping on the spiral where it could build up. The number of nozzles may be approximately equal to the number of turns of the spiral along the length of the drum, although preferably, chocolate should not be added in the last several pitch lengths of the drum in order to allow the chocolate to fully solidify onto the particulate solids before exiting the drum. The nozzles may be connected to a chocolate delivery pipe mounted along the centerline of the drum, which pipe may be supplied through a rotary union connected to the end of the drum shroud. A synchronization system may allow chocolate to be pumped on the particles when the nozzles are located above the particles tumbling in the drum. With this arrangement, chocolate is only added during the portion of the drum rotation when the nozzles are located approximately above the particles.

As another example, a nozzle arrangement is also possible where chocolate is added to the particles during the majority of the drum rotation. A spiral slot is cut into the inner tube for each nozzle to pass through. A single nozzle slot occupies slightly less than 360 degrees of drum rotation and is located midway between adjacent turns of the spiral. A synchronized motor and positioning system may be designed to allow the nozzles to maintain their bottom centerline location while adding chocolate for slightly less than 360 degrees of drum rotation. A reciprocating system may be provided to stop the chocolate flow and move the nozzles back to their starting positions at a high rate of speed correlating to a drum rotation of about 10 degrees. The nozzles may then repeat the chocolate addition process. A louver, rubber seal, or brush arrangement is possible to cover all sections of the slot, except where the nozzle is passing at that point of rotation, to prevent bypass of air.

Upon motion being imparted to the spiral, the particulate solids are pushed through the drum to a solids exit area 70. The length and diameter of the drum are sized to give the desired residence time of the particulates in the drum, considering the drum diameter, pitch of the turns of the spiral, depth of the bed of particulates formed in the drum, and the speed of revolution of the drum. A larger drum is preferable when more tumbling energy needs to be imparted to the particles, and where larger flow rates are required. Process economics will dictate whether a plurality of drums arranged in series is preferable to a single, larger drum. For typical applications in the food industry, with particulates in a range of 1 mm to about 100 mm, it is expected that a suitable drum diameter is in a range of about 0.01 m to about 20 m, preferably in a range of about 0.1 m to about 5 m. The length of the drum preferably is in a range of about 0.1 m to about 10 m.

Typically, the spiral rotates with the drum and the drum is generally capable of rotating at a speed of about 0.1 RPM to about 20 RPM. Preferably, for most gas-solids contact operations, including coating, a speed of 1 RPM to about 5 RPM is satisfactory. In most applications, for most reasonable apparatus configurations, this speed of rotation yields a solids flow rate of about 0.1 kg/min to about 100 kg/min. The residence time in the drum for most coating and/or gas-solids contact operations is in a range of about 1 minute to about 60 minutes.

If desired, coated particulate solids exiting the drum can be returned via conveyors back to the inlet end of the machine and introduced while stopping the introduction of the uncoated product so that additional coating material can be added on the surface.

The spacing between adjacent turns of the spiral must be at least about 3 times as large as the width of the individual particulates to prevent clogging of the particulates in the turns of the spiral. More preferably, the pitch of a spiral element is in a range of about 1 cm to about 50 cm.

In the embodiment shown in FIG. 2, the inner tube is designed so that it can be removed for cleaning and maintenance of the interior of the drum, and for installation of instruments and/or coating material application equipment and to allow the required drying air flow. It is expected that the diameter of the inner tube will be in a range of about 0.001 m to about 10 m. In embodiments, the inner tube extends from a first end of the drum and does not extend the entire length of the drum, as described above. The length of the inner tube defines a gas-solids contact zone. Thus, in FIG. 1A, from the point where the inner tube 20 terminates to the point where solids drop into the drum at solids entry point 130, is the solids entry zone. From the gas supply 90 to the beginning of the inner tube 20 is the gas entry zone. Preferably (at least in the embodiments wherein the apparatus is used for coating particulates and drying), particulate solids can be fed to the drum and coated with flowable coating material in the solids entry zone before being contacted with significant drying air flow. Where the apparatus is used for coating chocolate particulates with a sugar solution followed by drying, a ten-foot-long drum with a six-foot-long inner tube has been found to be operable.

If chocolate, a chocolate-like substance, fat-based material (such as cocoa butter) or other coating material crystallizable upon cooling is used, temperature control may be provided to the coating material dispenser to keep the material in a flowable state. This may include, for example, thermal jacketing provided with a heat exchange fluid, electrical heaters, and the like.

While in some instances it may be possible to feed enough particulate solids into the drum to completely fill the annular space, in most cases, it is more desirable to have a particle bed 36 formed, such that there is a distance between the top of the particle bed 36 and the inner tube 20, as shown in FIG. 1A. This distance is referred to as the particle to inner tube annulus. The annulus size is primarily chosen to achieve the desired air flow and velocity, which impacts both the effective heat and mass transfer rate and the overall energy balance between air and particulates. Generally, the depth of the particle bed at the deepest point is in a range of about 10% to about 90% of the distance between the interior wall of the drum and the inner tube. Therefore, the particle to inner tube annulus is generally in a range of about 90% to about 10% of the distance between the interior wall of the drum and the inner tube. In the method practiced according to the invention, it is preferred to maintain a predetermined minimum particle to inner tube annulus.

The gas used in the present invention, whether for drying, cooling or heating, is typically air which has been conditioned to remove dust and to have a specified moisture content (dew point) and temperature. Gas may be removed from the drum at gas exit 94 and conditioned with an air conditioner or "handler" (not shown). The conditioned gas is then recycled to the gas supply 90. The properties of the gas will depend on the process requirements, but typically the dew point of the gas supply is in a range of about −40° C. to about 10° C., preferably in a range of about −20° C. to about 10° C. The flow rate of gas is generally in a range of about 0.01 cubic meters per second to about 100 cubic meters per second, and the temperature is in a range of about −10° C. to about 250° C. The apparatus operates at about atmospheric pressure, though the actual pressure may be slightly higher or lower.

EXAMPLES

Example 1

In this Example, an apparatus having the configuration shown in FIG. 1A is used for continuously coating sugar syrup on confectionery centers. The drum is 1.23 meters in diameter with a working distance between the spiral flights of 15 cm. The length of the drum is 3 meters. The diameter of the closed, air-impermeable inner tube is 61 cm, and the length is about 2.44 meters. An air conditioning system is connected to the system in order to supply air at the desired flow rate, temperature, and humidity. Air is flowed along a spiral pathway countercurrently to the movement of the solids.

The coating drum is equilibrated to 20° C. by storage in a 20° C. room. The drum speed is set to 2 RPM. Starting materials consisting of lentil-shaped chocolate pieces (also called "centers") at 20° C. and weighing 0.6 grams each are introduced into one end of the drum at a flow rate of 500 kg/hr. Coating syrup consisting of 66.7 wt % sucrose and 33.3 wt % water is pumped onto the entering pieces at a flow rate of 7.5 kg/hr at the same end of the drum. Drying air is pumped into the drum countercurrently to the product flow at the opposite end of the drum at a flow rate of 15 cubic meters/min. The air flow is increased to obtain more dry product or decreased to leave more moisture in the product. The temperature of the air is 50° C. with a dew point of −10° C. After approximately 10 minutes residence time, the coated product emerges from the system. Each coated product piece increases in weight by approximately 1 wt % on each passage through the system. The weight loss between added material and exit material is from water removed by the drying air.

The flow of solids in the apparatus approximates plug flow. Therefore, after the first coated product emerges, the bare centers input can be stopped. The coated product can be recycled back to the solids entry zone of the drum as many times as needed to obtain the desired consistent number of shell layers on each piece. In the present example, the coating time is about 250 minutes. This results in each piece having passed through the spiral coater approximately 22 times and having close to 20% by weight hard sugar shell added. This coating process requires a 21 kg surge hopper in the recycle loop to accept the increase in mass/volume of the product as sugar shell is added.

If desired, the sugar coating process could alternatively be accomplished using 22 drums in series so that recycle would not be necessary. The operating conditions of each drum in the series would need to be adjusted to account for the greater mass input as the product progresses downstream. The first drum in the series would most preferably be operated as described above.

Example 2

An apparatus substantially similar to that depicted in FIG. 1A with the same physical geometry as described in Example 1 is used to perform continuous baking of peanut crackers. The starting material is 80 wt % oil-roasted peanuts coated with a 20 wt % layer of firm dough at 20° C. The dough composition on a dry weight basis is approximately 38% corn flour, 38% corn starch, 17% water, 3% 43DE corn syrup solids, 2% gum arabic, and 2% sucrose. No coating material is added inside the apparatus. In order to bake the products, 30 cubic meters per minute of hot air (200° C.) having a dew point of 10° C. is pumped into the system. The speed of the drum is set to 2 RPM. The movement of solids in the apparatus is adjusted in order to obtain product with an exit temperature of 120° C. The solids inlet flow rate is reduced if the exit product temperature falls below 120° C. Conversely, the product flow rate is increased if the exit product temperature exceeds 120° C. Baked peanut crackers are withdrawn from the continuous apparatus ready for use or further processing.

As one pass through the system delivers the desired end product there is no need for recycle.

Example 3

An apparatus substantially similar to that depicted in FIG. 1A with the same physical geometry as described in Example 1 is used to perform continuous coating of oil-roasted peanuts with chocolate. The primary difference is that, in place of the syrup addition tube, a reciprocating chocolate manifold is used to apply chocolate to the peanuts in each of the zones of the spiral. The coating drum is equilibrated to 5° C. by storage in a 5° C. room. The drum speed is set to 4 RPM. Starting materials consisting of oil-roasted peanuts (also called "centers") weighing 2 grams each at 15° C. are introduced into the drum at a flow rate of 1000 kg/hr. SOI chocolate is sprayed onto the peanuts at 125 kg/hr uniformly along the first two-thirds of the drum length. Cooling air at 5° C. is pumped into the drum at a flow rate of 50 cubic meters/min co-current to the product flow at the same end of the machine where the peanuts enter. The air flow is increased to obtain colder product or decreased to allow more smoothing of the product. After approximately 5 minutes residence time, the coated product emerges from the system still at 15° C. or slightly higher if more smoothing is desired. Each coated product piece increases in weight by approximately 11.1 wt % on each passage through the system.

The flow of solids in the apparatus approximates plug flow. Therefore, after the first coated product emerges, the bare peanuts input can be stopped. The coated product can be recycled back to the solids entry zone of the drum as many times as needed to obtain the desired weight percent chocolate shell. In the present Example, the coating time is about 80 minutes. This results in each peanut center having passed through the spiral coater approximately 11 times. The final product composition is 2 parts chocolate for every 1 part peanut. This chocolate coating process requires an approximately 167 kg surge hopper in the recycle loop to accept the increase in mass of the product as chocolate is added.

If desired, the same chocolate coating process could alternatively be accomplished using 11 drums in the series. The size of each drum in the series may need to increase as the product progresses downstream in order to account for the large increase in volume of the product. The potential exists that the process conditions or a combination of drum geometry and process conditions could also be adjusted as the product progresses downstream.

The foregoing examples and detailed description are for the purposes of illustration only and are not to be deemed limiting of the invention, which is defined by the appended claims.

What is claimed is:
1. A gas-solids contact apparatus, comprising:
a drum having an interior wall concentric with an inner tube and defining an annular space between the drum and the inner tube;
a source of gas supplying gas to the annular space at a gas entry zone;
a solids entry point for introducing particulate solids to the drum;
at least one rotatable spiral element in the annular space and oriented on the same axis as the drum defining a spiral gas pathway such that gas does not travel axially through the annular space except along the spiral gas pathway; wherein
the inner tube is a closed, air-impermeable volume; and the apparatus is adapted to impart rotary motion to the spiral element and/or drum to move the solids through the drum.

2. The gas-solids contact apparatus of claim 1, wherein the inner tube comprises apertures permitting flow of a gas from the source of gas into the inner tube and from the inner tube into the annular space between the drum and the inner tube.

3. The apparatus of claim 1, wherein the spiral element is attached to, and extends radially inward from, the interior wall of the drum and rotates with the drum.

4. The apparatus of claim 1, wherein the spiral element is attached to, and extends radially outward from, the inner tube and rotates with the inner tube.

5. The apparatus of claim 1, further comprising a coating material dispenser.

6. The apparatus of claim 1, further comprising: a gas removal zone where gas is removed from the drum, and a gas conditioning system adapted to filter the gas removed from the drum, to condition the gas to a predetermined temperature and relative humidity, and to redirect the conditioned gas to the drum.

7. The apparatus of claim 1, wherein: the drum is rotatable around a horizontal longitudinal axis; and the gas entry zone and the solids entry point are proximate opposite ends of the drum with respect to the longitudinal axis so that the flow of gas along the gas pathway is substantially countercurrent to the movement of the solids in the drum.

8. The apparatus of claim 1, wherein: the drum is rotatable around a horizontal longitudinal axis; and the gas entry zone and the solids entry point are proximate the same end of the drum with respect to the longitudinal axis, so that the flow of gas along the gas pathway is substantially co-current with the movement of the solids in the drum.

9. The apparatus of claim 7, wherein: the inner tube extends from an end of the drum proximate the gas entry zone and terminates inward of an opposite end of the drum, the length of the inner tube defining a gas-solids contact zone within the drum, a solids entry zone extending from a point where the inner tube terminates to the solids entry point, whereby the gas has higher velocity in the gas-solids contact zone than in the solids entry zone.

10. A gas-solids contact apparatus, comprising:
a drum having an interior wall concentric with an inner tube and defining an annular space between the drum and the inner tube;
a source of gas supplying gas to the annular space at a gas entry zone;
a solids entry point for introducing particulate solids to the drum;
at least one rotatable spiral element in the annular space and oriented on the same axis as the drum defining a spiral gas pathway such that gas does not travel axially through the annular space except along the spiral gas pathway; wherein
the drum is rotatable around a horizontal longitudinal axis; and the gas entry zone and the solids entry point are proximate opposite ends of the drum with respect to the longitudinal axis so that the flow of gas along the gas pathway is substantially countercurrent to the movement of the solids in the drum;
the inner tube extends from an end of the drum proximate the gas entry zone and terminates inward of an opposite end of the drum, the length of the inner tube defining a gas-solids contact zone within the drum, a solids entry zone extending from a point where the inner tube terminates to the solids entry point, whereby the gas has higher velocity in the gas-solids contact zone than in the solids entry zone; and
the apparatus is adapted to impart rotary motion to the spiral element and/or drum to move the solids through the drum.

* * * * *